United States Patent [19]
Denton et al.

[11] Patent Number: 5,613,174
[45] Date of Patent: Mar. 18, 1997

[54] IMAGING DEVICE WITH POSITIVE AIR PRESSURE AND ELECTROSTATIC PRECIPITATOR

[75] Inventors: Gary A. Denton, Lexington, Ky.; Douglas A. Kreckel, Webster; Paul F. Sawicki, Rochester, both of N.Y.

[73] Assignee: Xerox Corporation, Stamford, Conn.

[21] Appl. No.: 540,369

[22] Filed: Oct. 6, 1995

[51] Int. Cl.⁶ .................................................. G03G 21/00
[52] U.S. Cl. .................................................. 399/98
[58] Field of Search ........................... 355/215, 232; 347/134, 138, 257

[56] References Cited

U.S. PATENT DOCUMENTS

| | | | |
|---|---|---|---|
| 3,754,821 | 8/1973 | Whited | 355/326 R |
| 4,387,982 | 6/1983 | Stanley | 355/215 |
| 4,469,430 | 9/1984 | Terashima | 347/134 |
| 4,530,589 | 7/1985 | Adams | 355/215 |
| 4,970,552 | 11/1990 | Okamoto et al. | 355/215 |
| 5,059,991 | 10/1991 | Morisawa | 347/138 |
| 5,398,099 | 3/1995 | Nagamochi et al. | 355/215 |

*Primary Examiner*—William J. Royer
*Attorney, Agent, or Firm*—H. Fleischer; J. E. Beck; R. Zibelli

[57] ABSTRACT

An apparatus for illuminating a photoconductive surface. The apparatus includes a housing defining a chamber and an open end. An imaging device is placed in the housing chamber. The imager transmits light rays through the open end of the housing to the photoconductive surface. An air pump is coupled to the housing. The air pump maintains an outwardly directed flow of air from the open end of the housing so as to move particles away from the open end. Electrically biased electrodes are located between the imaging device and the photoconductive surface. They attract the particles so as to prevent the particles from contaminating the imaging device.

19 Claims, 5 Drawing Sheets

IMAGING DEVICE WITH POSITIVE AIR PRESSURE AND ELECTROSTATIC PRECIPITATOR

This invention relates generally to an imaging apparatus for electrophotographic printing. More specifically, the invention relates to an imager with low positive air pressure and an electrostatic precipitator for removing airborne particles that may otherwise adhere to optical elements and cause copy quality defects and light loss.

In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern known as a latent image. The latent image is developed by contacting it with a developer material consisting of a liquid or powder wherein, toner is from a carrier. The toner is held on the image areas by the electrostatic charge on the photoreceptor surface. Thus, a toner image is produced in conformity with a light image of the original being reproduced. The toner image is transferred to a copy sheet, and the image affixed thereto to form a permanent record of the image to be reproduced. Subsequent to development, excess toner left on the photoreceptor is cleaned from its surface. The process is useful for light lens copying from an original document or for printing electronically generated or stored originals such as with a raster output scanner (ROS), where a charged surface may be imagewise discharged in a variety of ways.

The foregoing discussion generally, describes a typical black and white or single color electrophotographic printing process. The approach utilized for multicolor electrophotographic printing is substantially identical. However, instead of forming a single latent image on the photoreceptor, multiple latent images corresponding to different color separations are sequentially recorded on the photoreceptor. Each single color latent image is developed with toner complimentary thereto. This process is repeated for each of the differently colored images with a respective toner of a complimentary color. Thereafter, each single color toner image is transferred to the copy sheet in superimposed registration with the prior toner image, creating a multi-layered toner image. This multi-layered toner image is permanently affixed to the copy sheet in a conventional manner to form a finished color copy.

A constant problem in an electrophotographic printing machine is the need to reduce the effects of airborne particles created during operation. These particles include: toner particles used to develop the latent image on the photoreceptor, paper dust from a sheet transport, loose particles from a document handler, degraded portions of a doctor blade or transfer roll, and the normal dust and dirt from the surrounding environment. One source of image quality degradation is the adhering of the particles to the surfaces of optical components used to discharge areas on the photoreceptor with a modulated laser beam generated by the ROS. These ROS components are arranged along an optical path and include mirrors and lenses. Over time, they may acquire a sufficient layer of particles so as to reduce exposure, at the photoreceptor, by partially blocking light reflected from or transmitted through them. The particles can also reduce contrast, in an image exposure profile at the photoreceptor, by scattering light reflected from a mirror component. This may produce dark lines in light areas in conventional charged area development systems, or it may produce light streaks in imaged areas in systems employing discharge area development, the lines in both cases being aligned in the direction of the photoreceptor motion.

Various methods of reducing ROS contamination problems associated with airborne particles are known in the art. One technique is to provide a positive air flow across the exposed ROS components so as to prevent particle adhesion at their surfaces. Another technique of isolating the ROS is to place it inside a housing. The modulated laser beam then exits the housing through an aperture which may have a transparent window attached thereto. However, the airborne particles may still affect exposure and copy quality. With an aperture not having an transparent window, turbulent air allows particles to enter the ROS housing and make their way to the optical components. An aperture having a transparent window is still susceptible to contamination on the outside surface.

The following disclosures may be relevant to various aspects of the present invention.

U.S. Pat. No. 3,754,821
Patentee: Charles A. Whited
Issued: Aug. 28, 1973

U.S. Pat. No. 4,387,982
Patentee: Michael R. Stanley
Issued: Jun. 14, 1983

U.S. patent application Ser. No. 8/343,145
Applicant: John R. Andrews et al.
Filed: Nov. 12, 1994

The disclosure of the above-identified patents and application may be briefly summarized as follows U.S. Pat. No. 3,754,821 discloses an automatic control for regulating a multi-color developing system used in an electrophotographic printing machine. The control includes a transparent electrode assembly, light source, fiber optics, photo sensor, and logic for processing an electrical output signal. The transparent electrode assembly is located in a non-image portion of a photoconductive surface. As the electrode passes through a development zone, its conductive surface is biased with an electrical potential simulating a latent image on the photoconductive surface. The density of the image developed on the transparent electrode is sensed by the photo sensor. An output signal from the photo sensor is processed by the logic, and depending upon the density of the toner deposited on the electrode, toner may or may not be added to the respective color developer unit. The photo sensor is mounted external to the photoconductive surface and positioned to sense the density of the toner deposited on the transparent electrode just prior to cleaning the photoconductive surface. Light rays from the light source are conducted to the transparent electrode by the fiber optics.

U.S. Pat. No. 4,387,982 discloses an electrode plate which reduces the scattering of charged particles from a storage housing of a developer unit used in an electrophotographic printing machine. The electrode is electrically biased to a voltage different from that of an image voltage recorded on a photoconductive surface. The bias voltage forms an electrical field between the photoconductor and the electrode so as to attract or repel charged particles therefrom. The electrode is removable from the printing machine to clean away collected particles.

U.S. patent application Ser. No. 8/343,145 describes a method for reducing the rate by which airborne particles are deposited on the surface of optical components contained within the housing of a ROS. The lenses, mirrors, and transparent exit window are coated with a low energy material to minimize the Van der Waal and capillary forces that cause small particle adhesion. Electrostatic charge build-up, which attracts larger particles, is reduced by modifying the lateral conductivity of the coating. A fluorinated carbon film is applied to the coating to dissipate the surface charge. Overall efficiency in removing a particulate layer is increased by the addition of air assisted cleaning.

In accordance with one aspect of the invention, there is provided an apparatus for illuminating a surface. The apparatus includes a housing defining a chamber and an open end. An optical device is placed in the chamber of the housing to transmit light rays through the open end of the housing to the surface. An air moving device is coupled to the housing and maintains an outwardly directed flow of air from the open end of the housing so as to move particles away from the open end of the housing. An electrically biased member is located between the optical device and the surface. It attracts particles thereto so as to prevent particles from contaminating the optical device.

In accordance with yet another aspect of the invention, there is provided a printing machine of the type in which a charged photoconductive surface is exposed to record an electrostatic latent image thereon. A housing defining a chamber and an open end is included. An optical device is placed in the chamber of the housing to transmit light rays through the open end of the housing to the charged photoconductive surface so as to record the latent image thereon. An air pump coupled to the housing maintains an outwardly directed flow of air from the open end of the housing so as to move particles away from the open end of the housing. Electrically biased electrodes are located between the optical device and the photoconductive surface and attract particles thereto so as to prevent particles from contaminating the optical device.

While the present invention will hereinafter be described in connection with a preferred embodiment thereof, it will be understood that it is not intended to limit the invention to that embodiment. On the contrary, it is intended to cover all alternatives, modifications and equivalents that may be included within the spirit and scope of the invention as defined by the appended claims.

For a general understanding of the features of the present invention, reference is made to the drawings. In the drawings, like reference numerals have been used throughout to designate identical elements. It will become evident from the following discussion that the ROS imager of the present invention is equally well suited for use in a wide variety of printing machines and is not necessarily limited in its application to the particular embodiment depicted herein.

Figure 1:
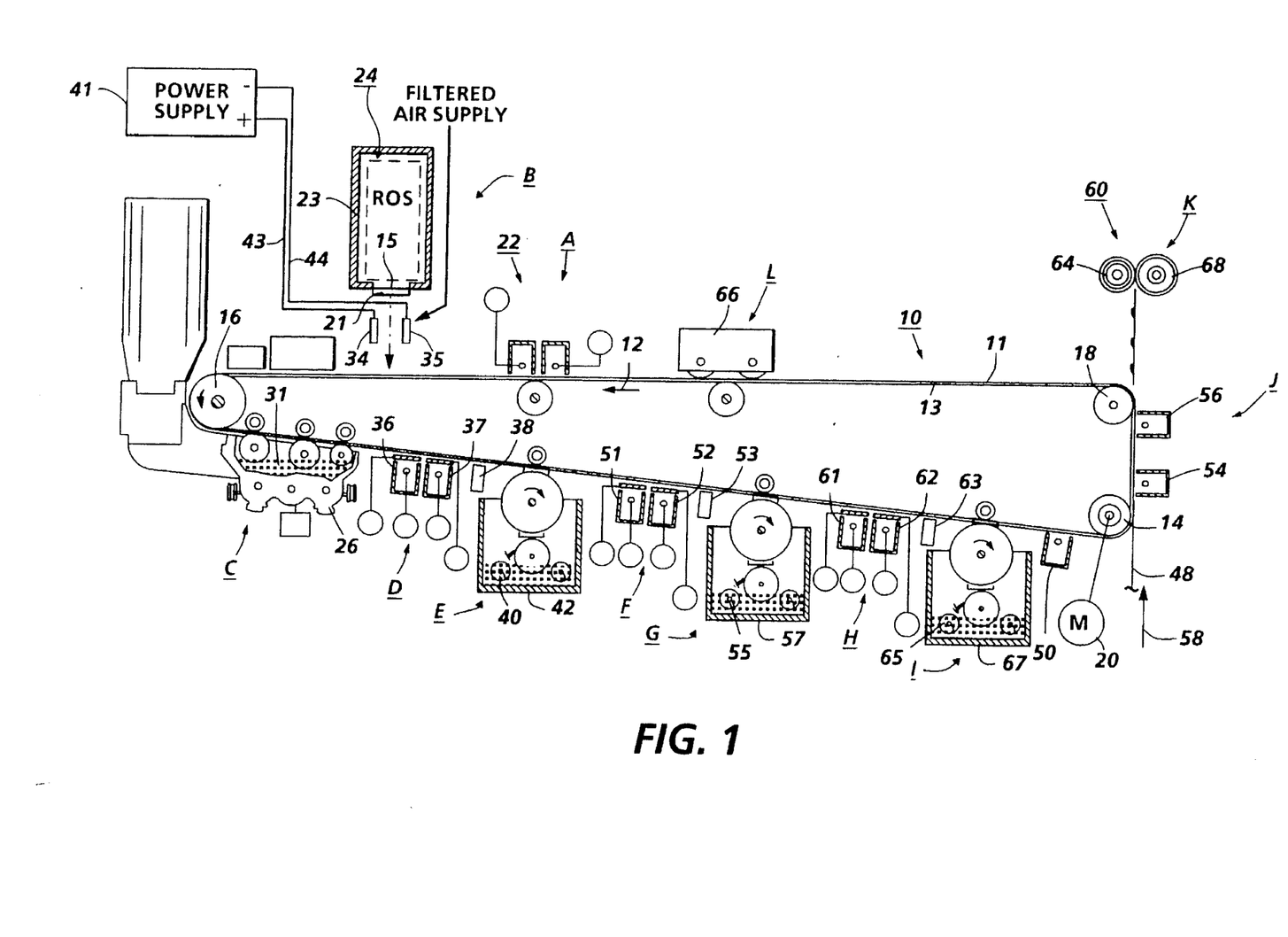
FIG. 1 is an elevational view of an illustrative printing machine incorporating the Raster Output Scanner (ROS) of the present invention therein.

Turning now to FIG. 1, which illustrates one form of an image-on-image printing machine, the printing machine of the present invention employs a photoreceptor 10 in the form of a belt having a photoconductive surface layer 11 on an electroconductive substrate 13. Photoreceptor belt 10 is supported for movement in the direction indicated by arrow 12, for advancing sequentially through the various xerographic process stations. The belt is entrained about a drive roller 14 and two tension rollers 16 and 18. Drive roller 14 is operatively connected to a drive motor 20 for effecting movement of the belt through the xerographic stations.

With continued reference to FIG. 1, a portion of belt 10 passes through charging station A where a corona generating device, indicated generally by the reference numeral 22, charges the photoconductive surface of belt 10 to a relatively high, substantially uniform potential. For purposes of example, the photoreceptor is negatively charged, however it is understood that the present invention could be useful with a positively charged photoreceptor, by correspondingly varying the charge levels and polarities of the toners, recharge devices, and other relevant regions or devices involved in the image-on-image color image formation process, as will be hereinafter described.

Next, the charged portion of photoconductive surface is advanced through an imaging station B. At imaging station B, the uniformly charged belt 10 is exposed to a laser based output scanning device 24 which causes the charge retentive surface to be discharged in accordance with the output from the scanning device. Preferably the scanning device is a laser Raster Output Scanner (ROS). Alternatively, the ROS could be replaced by other exposure devices, for example, a light lens system. After exposure, an electrostatic latent image is recorded on the photoconductive surface.

At a first development station C, a magnetic brush developer unit, indicated generally by the reference numeral 26 advances developer material 31 into contact with the electrostatic latent image. Developer unit 26 has a plurality of magnetic brush roller members. These magnetic brush rollers transport negatively charged black toner material to the latent image for development thereof. A power supply (not shown) electrically biases developer unit 26. While dry developer material has been described, one skilled in the art will appreciate that a liquid developer material may be used in lieu thereof.

At recharging station D, a pair of corona recharge devices 36 and 37 are employed for adjusting the voltage level of both the toned and untoned areas on the photoconductive surface to a substantially uniform level. A power supply is coupled to each of the electrodes of corona recharge devices 36 and 37. Recharging devices 36 and 37 substantially eliminate any voltage difference between toned areas and bare untoned areas, as well as to reduce the level of residual charge remaining on the previously toned areas, so that subsequent development of different color toner images is effected across a uniform development field.

A second exposure or imaging device 38 is used to selectively discharge the photoreceptor on toned areas and/or bare areas. This records a second electrostatic latent image on the photoconductive surface. A negatively charged developer material 40, for example, yellow color toner, develops the second electrostatic latent image. The toner is contained in a developer unit 42 disposed at a second development station E and is transported to the second latent image recorded on the photoconductive surface by a donor roll. A power supply (not shown) electrically biases the developer unit to develop this latent image with the negatively charged yellow toner particles 40.

At a second recharging station F, a pair of corona recharge devices 51 and 52 are employed for adjusting the voltage level of both the toned and untoned areas on the photoconductive surface to a substantially uniform level. A power supply is coupled to each of the electrodes of corona recharge devices 51 and 52. The recharging devices 51 and 52 substantially eliminate any voltage difference between toned areas and bare untoned areas, as well as to reduce the level of residual charge remaining on the previously toned areas so that subsequent development of different color toner images is effected across a uniform development field.

A third latent image is recorded on the photoconductive surface by imaging device 53. This image is developed using a third developer material 55 contained in a developer unit 57 disposed at a third development station G. An example of a suitable third developer material is magenta. Suitable electrical biasing of the developer unit 57 is provided by a power supply, not shown.

At a third recharging station H, a pair of corona recharge devices 61 and 62 adjust the voltage level of both the toned and untoned areas on the photoconductive surface to a substantially uniform level. The recharging devices 61 and 62 substantially eliminate any voltage difference between toned areas and bare untoned areas as well as to reduce the level of residual charge remaining on the previously toned areas, so that subsequent development of different color toner images is effected across a uniform development field.

A fourth latent image is created using imaging device 63. The fourth latent image is formed on both bare areas and previously toned areas of the photoreceptor that are to be developed with the fourth color image. This image is developed, for example, using a cyan developer material 65 contained in developer unit 67 at a fourth development station I. Suitable electrical biasing of the developer unit 67 is provided by a power supply, not shown.

One skilled in the art will appreciate that a liquid developer material may be used instead of the dry developer material at developer units 42, 57, and 67. However, for the dry developer material case, developer units 42, 57, and 67 are preferably of the type known in the art which do not interact, or are only marginally interactive with previously developed images. For examples, a DC jumping development system, a powder cloud development system, and a sparse, non-contacting magnetic brush development system are each suitable for use in an image-on-image color development system.

In order to condition the toner for effective transfer to a substrate, a negative pre-transfer corotron member 50 negatively charges all toner particles to the required negative polarity to ensure proper subsequent transfer.

A sheet of support material 48 is advanced, in the direction of arrow 58, to transfer station J by a sheet feeding apparatus, not shown. Preferably, the sheet feeding apparatus includes a feed roll contacting the uppermost sheet of a stack of copy sheets. The feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station J.

Transfer station J includes a transfer corona device 54 which sprays positive ions onto the backside of sheet 48. This attracts the negatively charged toner powder images from the belt 10 to sheet 48. A detack corona device 56 is provided for facilitating stripping of the sheets from belt 10.

After transfer, the sheet continues to move onto a conveyor (not shown) which advances the sheet to fusing station K. Fusing station K includes a fuser assembly, indicated generally by the reference numeral 60, which permanently affixes the transferred powder image to sheet 48. Preferably, fuser assembly 60 comprises a heated fuser roller 64 and a backup or pressure roller 68. Sheet 48 passes between fuser roller 64 and backup roller 68 with the toner powder image contacting fuser roller 64. In this manner, the toner powder images are permanently affixed to sheet 48. After fusing, a chute, not shown, guides the advancing sheet 48 to a catch tray, not shown, for subsequent removal from the printing machine by the operator.

After the sheet of support material is separated from photoconductive surface of belt 10, the residual toner carried on the photoconductive surface is removed therefrom. The toner is removed at cleaning station L using a cleaning brush structure contained in a housing 66.

The various machine functions described hereinabove are generally managed and regulated by a controller (not shown), preferably in the form of a programmable microprocessor. The microprocessor controller provides electrical command signals for operating all of the machine subsystems and printing operations described herein. It controls imaging onto the photoreceptor, paper delivery, xerographic processing functions associated with developing and transferring the developed image onto the paper, and various functions associated with copy sheet transport and subsequent finishing processes.

FIG. 1 illustrates an example of a printing machine having the photoconductive belt of the present invention therein to produce a visible image on image color output in a single pass or rotation of the photoreceptor. However, it is understood that the photoconductive belt of the present invention may be used in a multiple pass color image formation process. In a multi-pass system, each successive color image is applied in a subsequent pass or rotation of the photoreceptor. Furthermore, only a single set of charging devices is needed to charge the photoreceptor surface prior to each subsequent color image formation. For purposes of simplicity, both charging devices can be employed for charging the photoreceptor using the split recharge concept as hereinbefore described, prior to the exposure of each color toner latent image. Alternatively, a controller could be used to regulate the charging step so that only a single recharge device is used to charge the photoreceptor surface to the desired voltage level for exposure and development thereon. Also, only a single exposure device is needed to expose the photoreceptor prior to each color image development. Finally, in a multi-pass system, the cleaning station is of the type that is capable of camming away from the surface of the photoreceptor during the image formation process, so that the image is not disturbed prior to image transfer.

Figure 2:
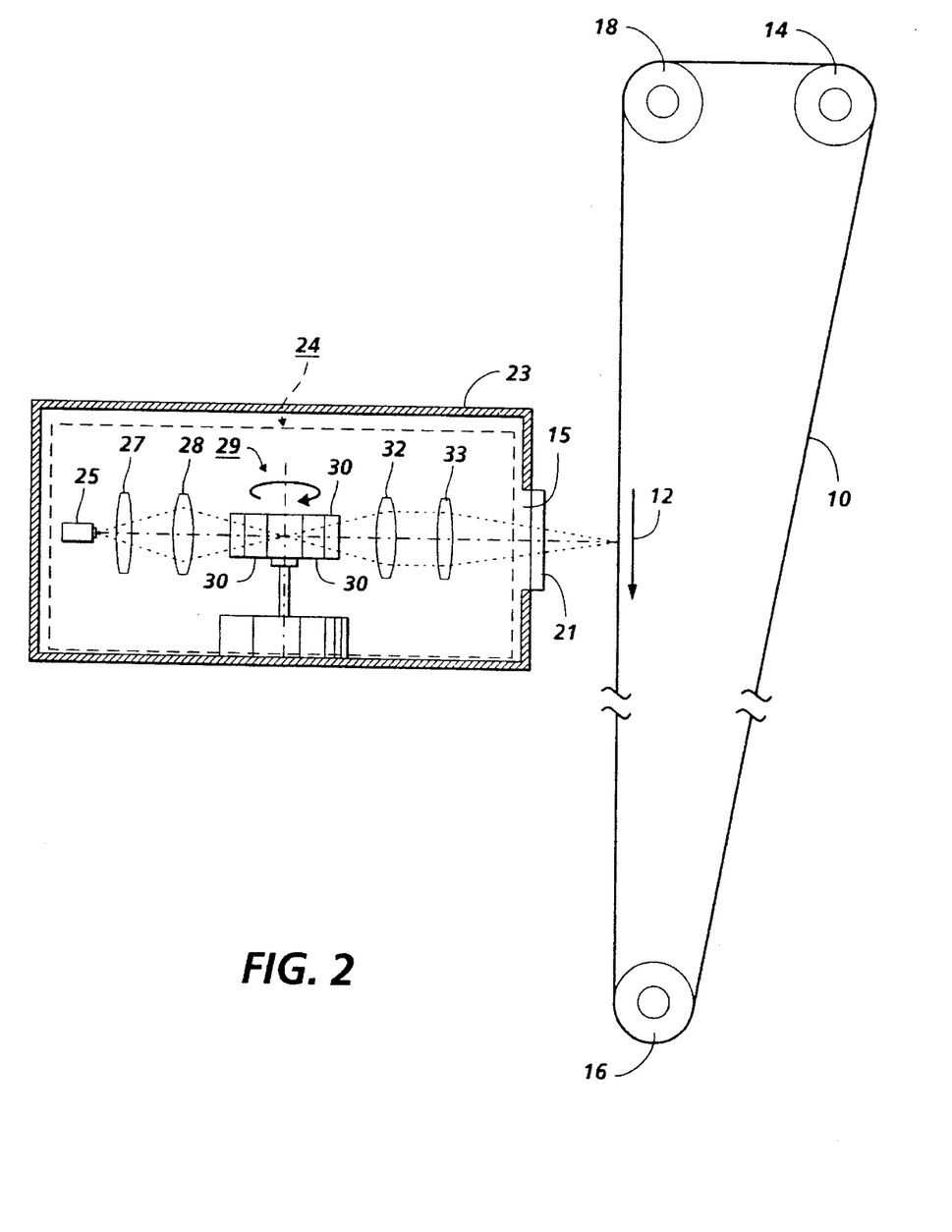
FIG. 2 is a plan view of the general optical configuration of a ROS system, showing optical components disposed at various locations along the scan path of, the ROS.

Moving now to a more detailed description of a ROS system used in the printing machine of FIG. 1, FIG. 2 shows a general configuration of the optical system and optical path of ROS 24. It will be understood that each imaging device 38, 53, and 63 in FIG. 1 may comprise similar components. ROS 24 is enclosed by a housing 23 and includes a gas, or preferably, laser diode light source 25. Input video data is transmitted to the laser source 25 for producing a modulated and diverging beam of coherent light. The beam may be collimated by a spherical lens 27 and then refocused by a cylindrical lens 28. Thereafter, the beam is incident upon a rotating polygon 29 having at least one mirrored facet 30 for reflecting the beam along a scan line through a post scan optics system. The post scan optics system is located between the rotating polygon 29 and photoreceptor 10. It comprises recollimating lens 32 and cylindrical lens 33. Lenses 32 and 33 function to firstly, reconfigure the beam reflected by facets 30 into a circular or elliptical crosssection and secondly, to refocus it onto the surface of photoreceptor 10. The beam leaves ROS 24 through a transparent exit window 21 which covers aperture 15 in housing 23. Any defects in scan linearity such as, for example wobble defects are also corrected by lenses 32 and 33. Polygon 29 is driven by a motor (not shown) via a shaft. The angular velocity of polygon 29 is synchronized with the angular velocity of photoreceptor 10 to permit construction of the latent image by an array of scan lines. A typical ROS can illuminate the charged portion of photoreceptor 10 at a rate of about 600 pixels per inch.

Figure 3:
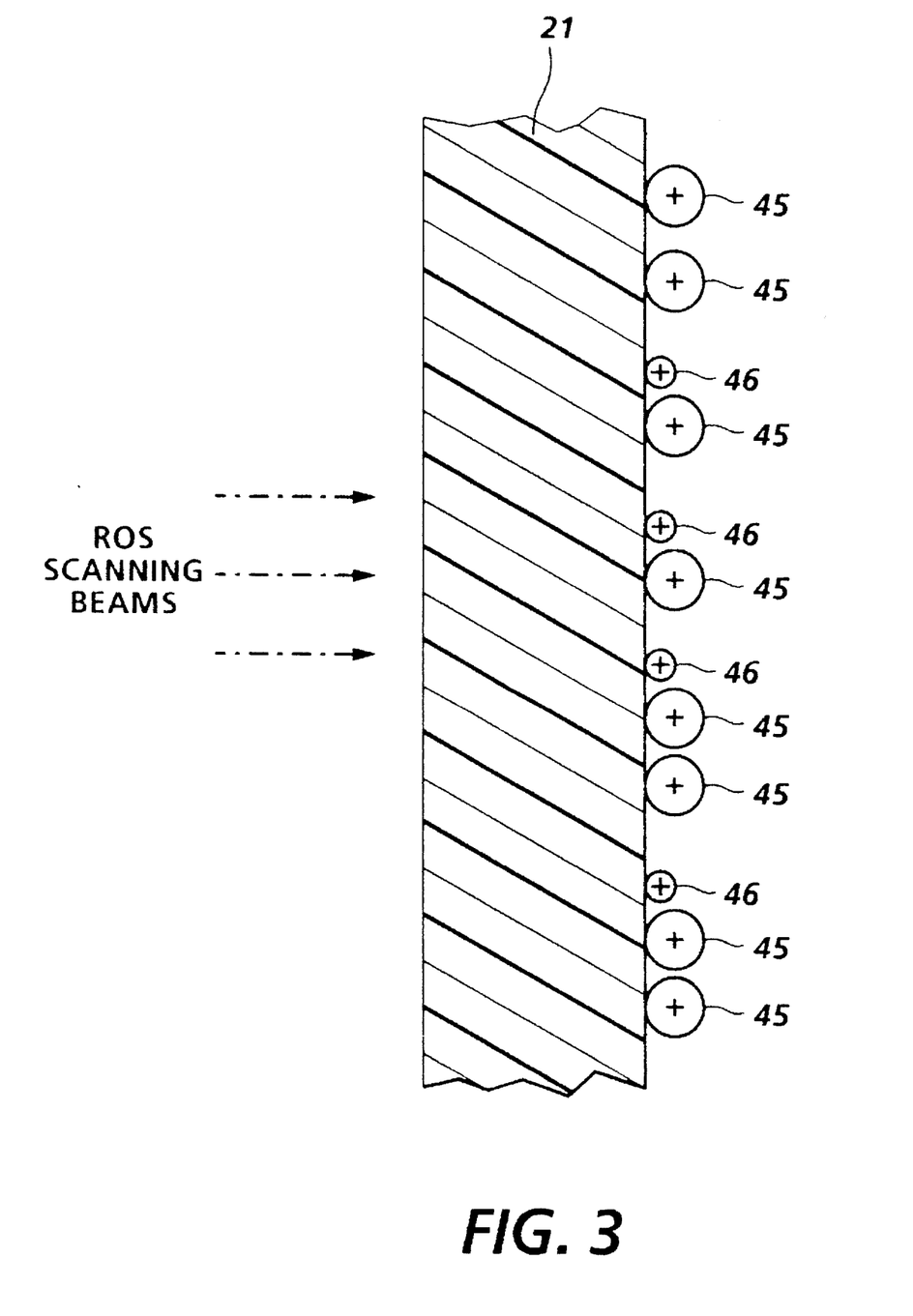
FIG. 3 is a partial side view of a transparent ROS exit window having a layer of particles adhering to its outer surface.

Referring to FIG. 3, FIG. 3 shows one example of particle contamination of an optical element. Specifically, FIG. 3 shows a partial side view of the transparent ROS exit window 21 having a layer of charged particles adhering to its outer surface. It is understood that in the case where no exit window is present, the mirrored facets 30 and the surfaces of lenses 27, 28, 32, and 33 in FIG. 1 may have similar particle adhesion. Since window 21 is a non-conductive glass, a static charge builds up on the surface during machine operation attracting oppositely charged particles to the outer surface. Since the primary source of contamination will be toner particles originating from developer units 26, 42, 57, and 67 in FIG. 1, the particles will be of the toner polarity. However, some non-toner particles will also adhere to the surface of window 21. In sum, the particle layer will consist of mainly larger toner particles 45 and smaller diameter non-toner particles 46. Particles 45 are positively charged and have a diameter of approximately 8 to 11 microns. Particles 46 are positively charged too, and have diameters of about 0.1 to 1 micron.

Figure 4:
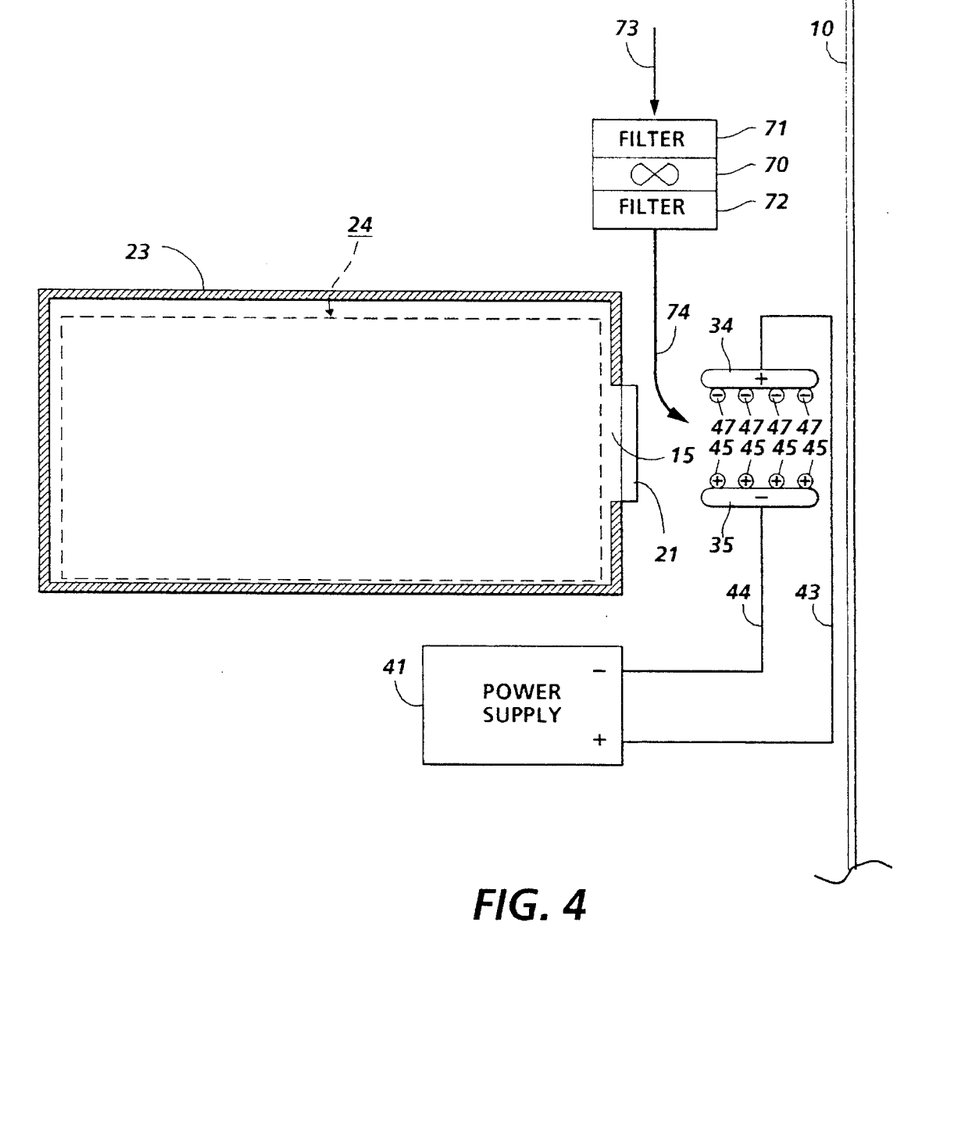
FIG. 4 is a schematic side view of a ROS housing configuration having positive air pressure and an electronic precipitator in accordance with the present invention.

FIG. 4 shows, in schematic form, a preferred embodiment of ROS 24 in accordance with the present invention. The specific configuration reduces the rate of particle contamination at the transparent window 21 over aperture 15 on housing 23. The rate of contamination is reduced by a combination of low positive air pressure and electrostatic precipitation. The low air pressure is supplied to the region between aperture 15 and photoreceptor 10. Input air must be filtered or otherwise cleaned to remove any airborne particles. An example of very clean air may be provided by filters. A pre-filter 71 would first remove larger dust and dirt particles from air flowing in the direction of arrow 73. Then a post-filter 72 absorbs smaller particles drawn through filter 71 by fan 70. Fan 70 provides the necessary air flow to sweep airborne particles away from window 21. It also acts as a barrier opposing the direction of travel for charged particles normally attracted to window 21. Since air flow cannot disturb the latent image (not shown) on photoreceptor 10, fan 70 provides a flow rate of approximately 2 to 5 millimeters per second in the direction of arrow 74.

Referring again to FIG. 4, a pair of electrodes 34 and 35 are located between aperture 15 and photoreceptor 10. Each electrode is about 10 millimeters wide and 30 to 46 centimeters long so as to cover a major portion of aperture 15 over which window 21 resides. The electrodes 34 and 35 form an electrostatic precipitator and may be fabricated from materials capable of transmitting an electrical current. They may be formed from a single conductor, a mesh of fine wires, or of NESA glass. A single power supply 41 provides a 5000 to 10,000 volt potential difference between the electrodes wherein, electrode 35 is connected via conductor 44 and electrode 34 is connected via conductor 43. The use of highly biased electrodes 34 and 35 reduces the velocity, and hence the volume of air from fan 70 to keep window 21 clean, thus decreasing the likelihood of causing undesired image disturbance, or alternatively of improving the efficacy of contaminant removal at a given gas flow rate. Electrodes 34 and 35 are positioned approximately 2 to 3 millimeters away from photoreceptor 10 to avoid corona discharges thereto. Without electrodes 34 and 35, air turbulence near aperture 15 allow airborne particles to migrate towards window 21. Instead, with opposing high-voltage charges placed on the electrodes, the migration of the larger charged particles, such as toner, is toward the electrode of charge opposite to that of the particles. Negatively charged particles 47 move to electrode 34 and the positively charged particles 45 go to electrode 35. Dispersion created by Van der Waal forces also help to attract uncharged and low charged particles to the electrodes. Periodic cleaning or replacement of electrodes 34 and 35, at an appropriate interval, is required to remove the deposits of contaminating particles.

Figure 5:
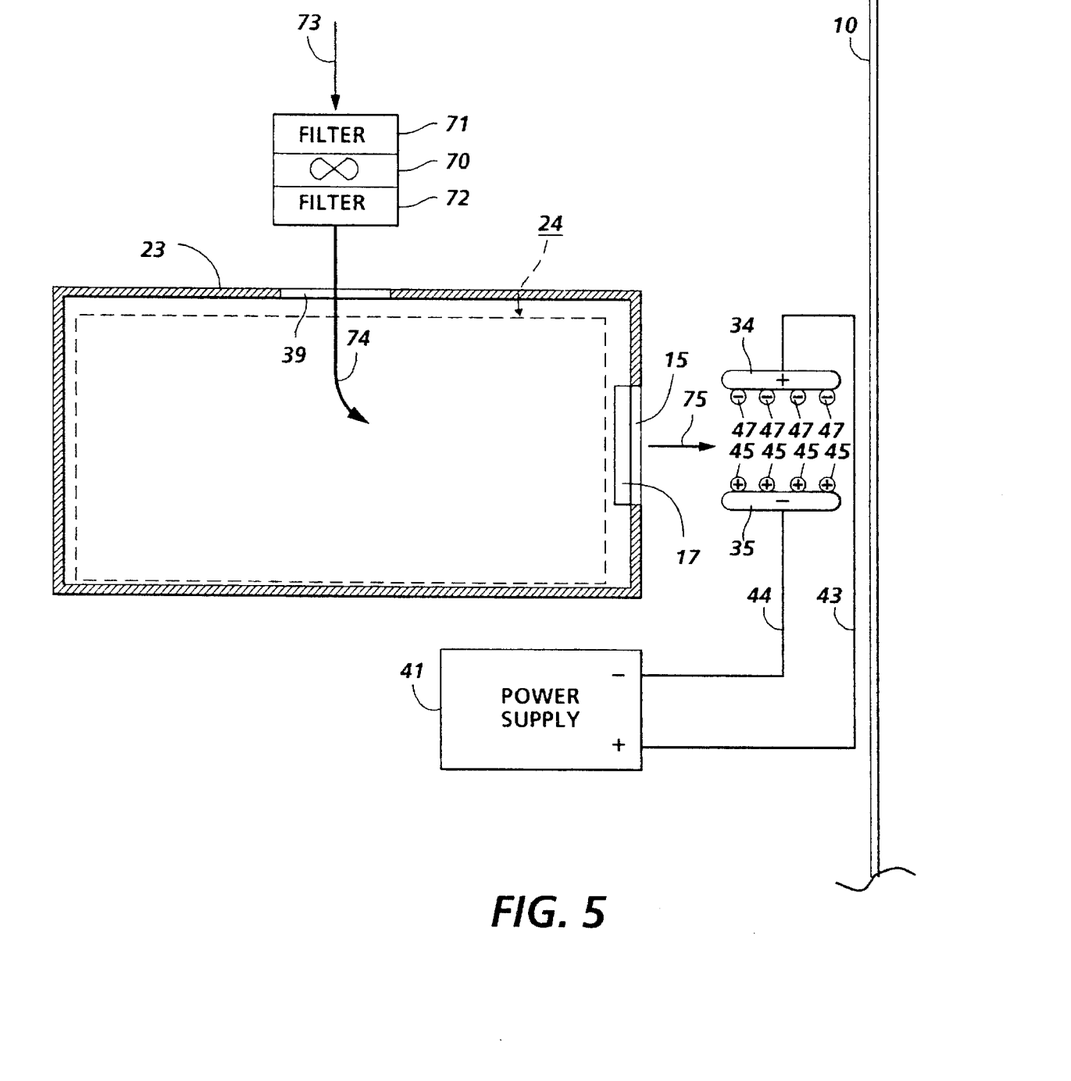
FIG. 5 is a schematic side view of an alternative ROS housing configuration having positive air pressure therein and an electronic precipitator in accordance with the present invention.

Turning now to FIG. 5, there is shown in schematic form, a second embodiment of ROS 24 in accordance with the present invention. The specific configuration reduces the rate of particle contamination on optical elements internal to housing 23. Since aperture 15 is not covered by a transparent exit window, shutter 17 closes off aperture 15 to prevent contamination when the machine is shut down. When the machine is operating, shutter 17 opens to allow light (not shown) to leave ROS 24 and expose photoreceptor 10. Consequently, airborne particles may enter housing 23. To prevent contamination of the optical components therein, low air pressure from fan 70, as indicated by arrow 74, is supplied through an opening 39. Dust and dirt, in air flow 73, are removed at filters 71 and 72. Clean air passes out of housing 23 through aperture 15. It moves in the direction of arrow 75 to form a barrier that blocks the entrance of charged particles thereto. As discussed hereinbefore, with reference to FIG. 4, electrodes 34 and 35 are biased with negative and positive voltages from power supply 41 via conductors 43 and 44 respectively. The low positive air pressure in air flow 75 and the electrostatic field between electrodes 34 and 35 work cooperatively so that charged particles migrate toward the electrode of charge opposite to that of the particles. Again, negatively charged particles 47 are attracted to electrode 34 and positively charged particles 45 are attracted to electrode 35.

In recapitulation, the present invention is directed to an imaging device employing a low positive air pressure and an electrostatic precipitator to prevent airborne particles from adhering to a transparent exit window or other optical elements contained therein. Low positive pressure from a filtered source of clean air acts as a barrier to oppose the migration of charged particles normally attracted to the window or optical elements. The electrostatic precipitator works cooperatively with the air pressure so that particles are attracted to the respective electrode having a charge opposite to that of the particles. Highly biased electrodes in the precipitator reduce the air velocity and air volume required from the filtered source., thereby decreasing the risk of disturbing the unfused image which would cause the copy to be unsatisfactory.

It is, therefore, evident that there has been provided, in accordance with the present invention, an imaging device with positive air pressure and an electrostatic precipitator that fully satisfies the aims and advantages of the invention as hereinabove set forth. While the invention has been described in conjunction with preferred embodiments thereof, it is evident that many alternatives, modifications, and variations may be apparent to those skilled in the art. Accordingly, it is intended to embrace all such alternatives, modifications, and variations which are within the spirit and broad scope of the appended claims.

We claim:

1. An apparatus for illuminating a surface, including:

a housing defining a chamber and an open end;

an optical device, disposed in the chamber of said housing, for transmitting light rays through the open end of said housing to the surface;

an air moving device, coupled to said housing, for maintaining an outwardly directed flow of air from the open end of said housing to move particles away from the open end of said housing; and an electrically biased member, interposed between said optical device and the surface, to attract particles thereto so as to prevent particles from contaminating said optical device.

2. An apparatus according to claim 1, wherein said electrically biased member includes:

a pair of electrodes defining a gap therebetween; and means for generating an electrostatic field across the gap between said electrodes to attract particles to said electrodes.

3. An apparatus according to claim 2, further including a shutter adapted to close the open end of said housing.

4. An apparatus according to claim 3, wherein said air moving device furnishes the flow of air in response to said shutter being opened.

5. An apparatus according to claim 2, further including a transparent member interposed between the chamber and open end of said housing to substantially seal the chamber.

6. An apparatus according to claim 5, wherein said air moving device includes an air pump adapted to direct the flow of air between said transparent member and the surface.

7. An apparatus according to claim 6, further including a filter operatively associated with said air pump to remove particle contaminates from the flow of air.

8. An apparatus according to claim 2, wherein said optical device includes a raster output scanner.

9. A printing machine of the type in which a charged photoconductive surface is exposed to record an electrostatic latent image thereon, wherein the improvement includes an imaging device comprising:

a housing defining a chamber and an open end;

an optical device, disposed in the chamber of said housing, for transmitting light rays through the open end of said housing to the charged photoconductive surface to record the latent image thereon;

an air moving device, coupled to said housing, for maintaining an outwardly-directed flow of air from the open end of said housing to move particles away from the open end of said housing; and an electrically biased member, interposed between said optical device and the photoconductive surface, to attract particles thereto so as to prevent particles from contaminating said optical device.

10. A printing machine according to claim 9, wherein said electrically biased member includes:

a pair of electrodes defining a gap therebetween; and means for generating an electrostatic field across the gap between said electrodes to attract particles to said electrodes.

11. A printing machine according to claim 10, further including a shutter adapted to close the open end of said housing.

12. A printing machine according to claim 10, further including a transparent member interposed between the chamber and open end of said housing to substantially seal the chamber.

13. A printing machine according to claim 12, wherein said air moving device includes an air pump adapted to direct the flow of air between said transparent member and the surface.

14. A printing machine according to claim 13, further including a filter operatively associated with said air pump to remove particle contaminates from the flow of air.

15. A printing machine according to claim 10, wherein said optical device includes a raster output scanner.

16. A printing machine according to claim 11, wherein said air moving device furnishes the flow of air in response to said shutter being opened.

17. A printing machine according to claim 9, further including means for developing the electrostatic latent image with toner.

18. A printing machine according to claim 17, comprising a plurality of imaging devices adapted to record a plurality of electrostatic latent images on said photoconductive surface, said developing means developing each of the plurality of electrostatic latent images with a different color toner to form a multicolor toner image on said photoconductive surface.

19. A printing machine according to claim 18, further including:

means for transmitting the multicolor toner image to a support sheet; and means for fusing the multicolor toner image to the support sheet.

\* \* \* \* \*